United States Patent [19]

Rizzuto et al.

[11] Patent Number: 5,611,262
[45] Date of Patent: Mar. 18, 1997

[54] CAPPUCCINO MAKER

[75] Inventors: Leandro P. Rizzuto, Greenwich; Theodore B. Mulle, New Milford, both of Conn.; Asik Braginsky, Forest Hills, N.Y.

[73] Assignee: Conair Corporation, Stamford, Conn.

[21] Appl. No.: 669,581

[22] Filed: Jun. 24, 1996

[51] Int. Cl.[6] ......................................... A47J 31/40
[52] U.S. Cl. ................................. 99/294; 99/290
[58] Field of Search ............... 99/279, 290, 293, 99/294, 295, 299, 300, 302 R, 316, 323.1; 426/433; 261/DIG. 16, DIG. 76

[56] References Cited

U.S. PATENT DOCUMENTS

| | | | |
|---|---|---|---|
| 4,565,121 | 1/1986 | Ohya | 99/293 |
| 4,660,466 | 4/1987 | Frics | 99/294 |
| 4,800,805 | 1/1989 | Mahlich | 261/DIG. 76 |
| 5,127,318 | 7/1992 | Selby | 99/295 |
| 5,265,520 | 11/1993 | Gluliano | 99/293 |
| 5,473,972 | 12/1995 | Rizzuto et al. | |

Primary Examiner—Robert W. Jenkins
Attorney, Agent, or Firm—Ohlandt, Greeley, Ruggiero & Perle

[57] ABSTRACT

A cappuccino maker having a housing, a steam source, a coffee filter and holder for making coffee using water from the steam source, a coffee dispensing spout for dispensing the coffee, a milk frother and a milk dispensing spout for dispensing the frothed milk, wherein the milk dispensing spout and the coffee dispensing spout are capable of dispensing milk and coffee over a single container-receiving location, thus permitting milk and coffee to be dispensed into a container without having to move the container, and also having a milk receptacle having a valve, and a first base for the milk receptacle having a valve actuator for engaging the valve and a raised lip for receiving the milk receptacle or, in the absence of the receptacle, a cleaning fluid, the lip forming a reservoir on the first base.

15 Claims, 4 Drawing Sheets

CAPPUCCINO MAKER

FIELD OF THE INVENTION

The present invention discloses a cappuccino maker which is easier to clean and which effectively, reliably and consistently provides frothed milk. The cappuccino maker of the present invention also provides various unique economies of manufacture and greater ease of use by the consumer.

A cappuccino maker is a device for producing a beverage of coffee and frothed milk. The coffee can be of any type, but is typically made from espresso beans. The milk can be of any type, including cream or non-dairy substitutes, and may be sweetened or unsweetened. The coffee and frothed milk are typically dispensed separately into a container, where they combine to form a cappuccino beverage.

BACKGROUND OF THE INVENTION

Cappuccino makers known in the art are subject to many limitations. They can be difficult to clean, difficult to use, vulnerable to breakdown and expensive to manufacture. The present invention provides several novel structures and components to address those problems and to provide an improved cappuccino maker.

Cappuccino machines of the prior art typically are difficult to clean and maintain. Because milk products are vulnerable to spoilage and buildup, they must be flushed and cleaned regularly from the internal components of the cappuccino machine. Existing machines require the user to remove and empty the milk receptacle, fill it with water or another cleaning fluid, and run the machine to flush milk residue from the system. This is time-consuming and inconvenient.

U.S. Pat. No. 5,473,972 to Rizzuto et at. (assigned to the assignee of the present invention) discloses a cappuccino maker of this design. It includes a housing, a steam source, coffee maker and coffee dispensing spout, and also discloses as improvements an integral or separate milk frothing unit comprising a venturi, a milk container latchable to the housing, and quick disconnect valves between the venturi and a frothed milk dispensing spout. This construction unit allows the milk container to be separated from the housing for storage in a refrigerator. The Rizzuto et al. patent also discloses quick disconnect valves between a milk delivery tube and the venturi, and a valve in the top of the milk container leading to the milk delivery tube. It further discloses the two dispensing spouts in close proximity, enabling the user to dispense milk and coffee into the same cup without having to move the cup between steps. A conical spring is contained within the venturi to assist in frothing the milk.

In addition to being inconvenient to clean, machines of this design have other limitations addressed by the present invention. Prior art machines having valves at the top of the milk receptacle tend to send a substantial and unmetered amount of air into the frothing device. As the milk is drawn up, the air sitting on the milk's surface is also drawn up through the valve and into the frothing device. This can limit frothed milk production. In addition, prior art machines use complex, user-set air intake valves which are expensive, and subject to breakage and mis-adjustment. The present invention has addressed these problems.

SUMMARY OF THE INVENTION

The present invention discloses a cappuccino maker comprising a housing, a steam source, a coffee filter and holder for making coffee using water from the steam source, a coffee dispensing spout for dispensing the coffee, a milk frother and a milk dispensing spout for dispensing the frothed milk, wherein the milk dispensing spout and the coffee dispensing spout are capable of dispensing milk and coffee over a container-receiving location, thus permitting milk and coffee to be dispensed into a container without having to move the container, and further includes a milk receptacle having a valve; and a first base for the milk receptacle having a valve actuator for engaging the valve and a raised lip for receiving the milk receptacle or, in an absence of the receptacle, a cleaning fluid, the lip forming a reservoir on the first base.

The present invention provides a unique solution to the problem of cleaning the cappuccino maker of milk and residue. The base for the milk receptacle has a lip extending upward from its edges to form a reservoir. This reservoir serves a dual purpose. First, it permits stable alignment between the milk receptacle and base. This allows ease of use and proper engagement of a valve in the receptacle with a valve actuator in the base.

More importantly, the reservoir enables a unique easy-clean design of the present invention. When the milk receptacle is disengaged from the base, e.g. for storage in a refrigerator, the cappuccino maker can be cleaned by the following steps. Water or another cleaning fluid is poured into the reservoir, and the espresso machine is activated. Water at a level above the top of the valve actuator will flow in by gravity and will be cycled through the milk frothing apparatus. This permits the user to flush the milk frothing apparatus of undesirable residue or buildup with ease, and significantly, without having to empty the milk receptacle.

This unique valve construction also provides improved milk frothing performance, beyond what is produced by prior art machines. The valve actuator of the present invention and the valve's location at the bottom of the receptacle provide an effective vapor seal as the milk is withdrawn because only milk, not air, is in contact with the valve. No additional air is introduced into the frothing valve beyond the proper amount set in the air intake tube, as discussed below. The addition of more air, unavoidable in prior art machines, tends to compromise the milk frothing process.

Froth production is also improved by a unique nozzle employed in the frothing valve to concentrate and accelerate the inflow of steam, to improve froth production. The cavity of the frothing valve has a substantially circular cross-section, and an aperture for receiving milk and air into the cavity that is tangentially offset from this circular cross-section. This unique construction permits improved frothing by sending the milk, air, and steam into a swirling vortex about the walls of the cavity. In addition, the frothing section downstream has two additional features which act to maximize froth: flared inner walls and a conical spring. As the milk/air/steam mixture contacts the flared walls and conical spring, it is further agitated and frothed.

Cappuccino machines are relatively complex machines and are expensive to manufacture. The present invention provides simplified constructions which maintain or improve performance while providing economies of manufacture. First, the frothing valve is located within the housing and is permanently connected in the factory to the steam intake tube and the milk dispenser. This construction eliminates the quick disconnect feature present in the prior art which allowed the frothing valve to be quickly disconnected from the main housing for cleaning (see, e.g., Rizzuto et al., discussed above). Not only is cleaning considerably more laborious under that method than the method disclosed by the present invention, but the quick disconnects also require expensive fittings and frequent maintenance. Thus, the construction of the present invention provides enhanced ease of cleaning, economies of production, and improved product reliability. In addition, the frothing valve of the present invention is made entirely of plastic, with the exception of a conical spring inserted into it. This reduces the expense of an otherwise costly element, without reducing its utility.

The present invention also incorporates a unique, simplified air intake valve. First, the air intake tube joins the milk uptake tube upstream of the frothing valve. This serves to properly mix air and milk before they are introduced into the frothing valve, which in turn maximizes froth production. Furthermore, the air intake tube has a unique air control plug inserted in its air intake end. The plug has a slot along at least part of its length. When the plug is inserted into the air intake tube, the volume of air taken in is controlled by the surface area and depth of the slot exposed. Thus, when the plug is installed, it can be set to allow a proper rate of air intake. This construction also provides a range of depth adjustment which will allow proper airflow. This provides reasonable manufacturing tolerances, reduced cost, and reduced need for maintenance, without compromising the performance of the air intake valve.

The cappuccino maker also uses a water receptacle having a lip about its lower surface, and a valve extending from the lower surface of the receptacle. The lip and valve engage the base and the valve actuator to provide proper alignment and secure seating for the water receptacle, and to prevent the introduction of additional air. This provides improved performance and ease of use in comparison with prior art machines. In combination with these features, the coffee is dispensed in proximity to the dispensing end of the frothed milk dispenser so that a cup can receive coffee and frothed milk, sequentially or simultaneously, without being moved. This arrangement is much more convenient for the user. Many prior art machines require the user to move the cup from a first coffee dispensing location to a second frothed milk dispensing location.

DESCRIPTION OF THE PREFERRED EMBODIMENTS

Figure 1:
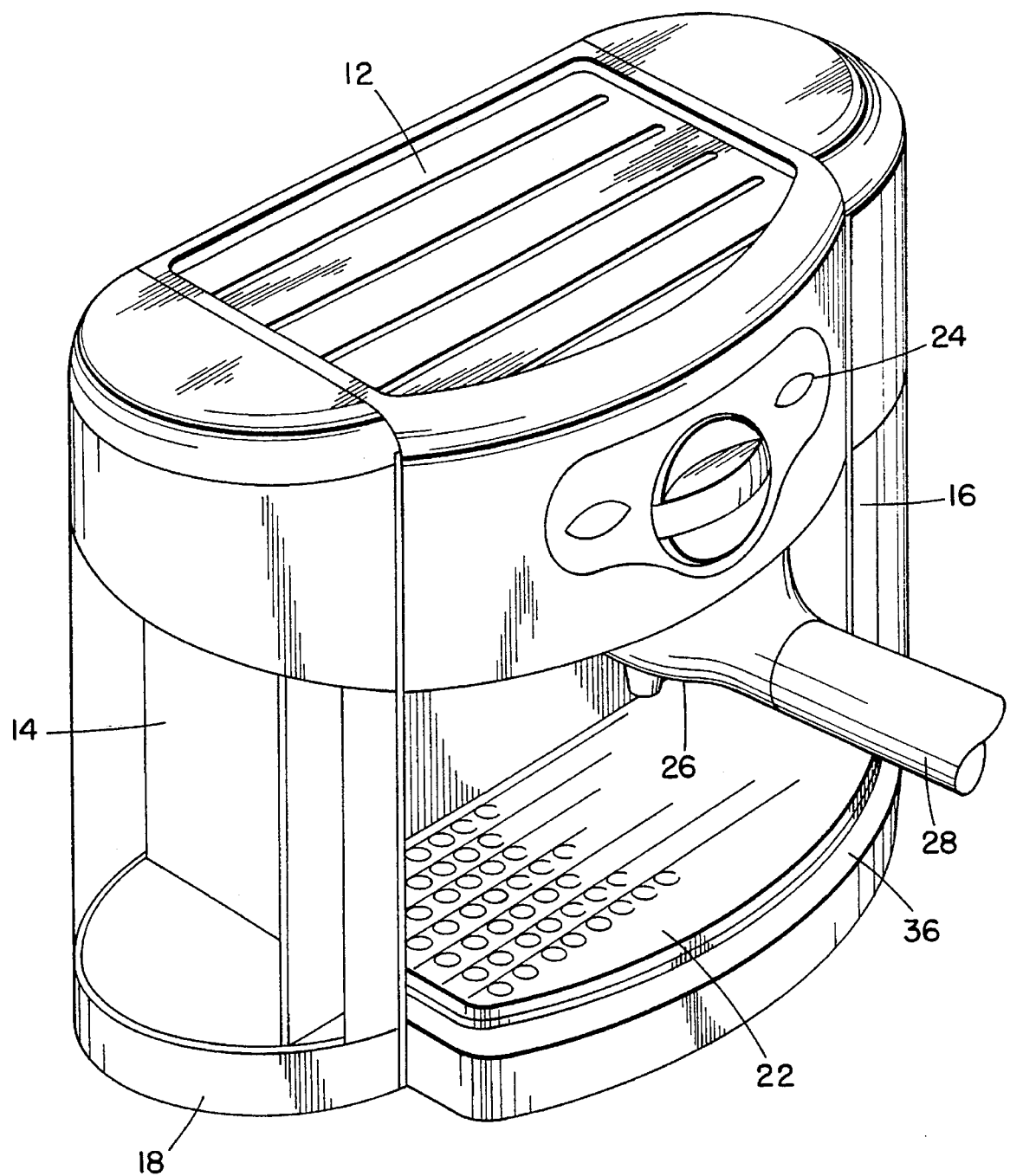
FIG. 1 is a perspective view of a preferred cappuccino maker incorporating the invention.

An assembled cappuccino maker according to a preferred embodiment of the present invention is shown in FIG. 1. The cappuccino maker 10 comprises housing 12, water receptacle 14, milk receptacle 16, bases 18 and 20, cup platform 22, heater switch 24, filter holder 26 and handle 28.

Figure 2:
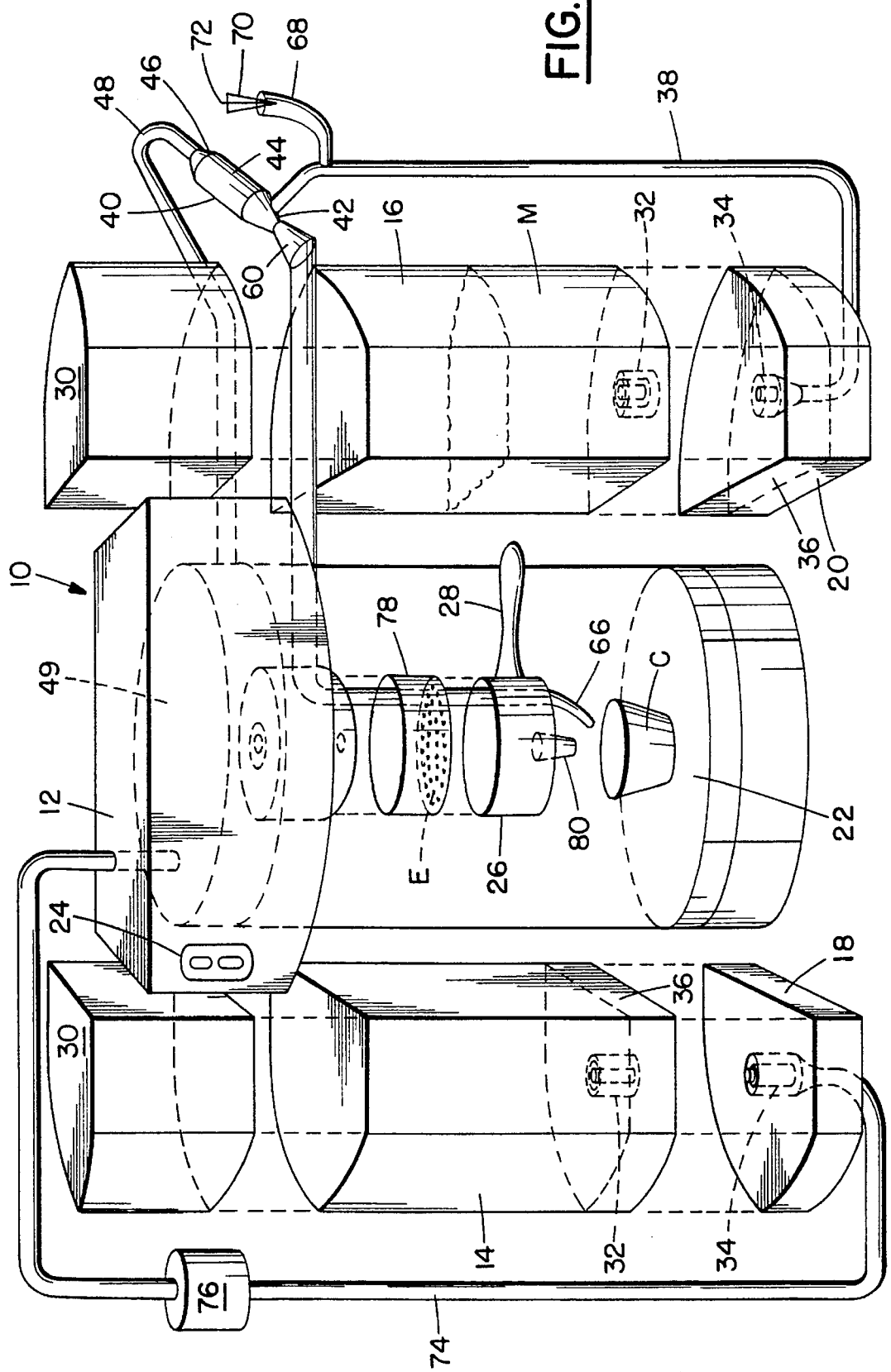
FIG. 2 is an exploded schematic front view of components of FIG. 1.

With reference to FIG. 2, the components of a preferred embodiment cappuccino maker are shown. Housing 12 includes a cup receiving location 22 for cup C or other container. Milk receptacle 16 carrying milk M has a flat bottom surface, lid 30 and a spring-loaded valve 32 extending upward and inward from its bottom surface. Valve 32 comprises a thick tube-shaped finger seated concentrically within an outer cylinder. Valve 32 is designed to fit onto the mating valve actuator 34 extending from base 20, which valve actuator has a central post seated concentrically within an outer thin tube-shaped finger. When engaged, valve actuator 34 activates valve 32 to allow the flow of milk M therethrough.

Base 20 is provided with a lip 36 extending upward from its edges to form a reservoir. This reservoir has dual functions. First, it permits a stable and properly aligned engagement between milk receptacle 16 and base 20. This allows ease of use and proper engagement of valve 32 and valve actuator 34. Furthermore, the reservoir enables a unique easy-clean design. When the milk receptacle 16 is disengaged from base 20, perhaps for storage in a refrigerator, the cappuccino maker can be cleaned by the following steps. Water or another cleaning fluid is poured into the reservoir formed by lip 36 on base 20. The espresso machine is activated. Water at a level above the top of valve actuator 34 will flow by gravity into valve actuator 34, will be cycled through the uptake tube 38 of the milk frothing apparatus described below, and will be dispensed into cup C. This permits the user to flush the milk frothing apparatus of undesirable residue or buildup with ease, and most importantly, without having to empty the milk receptacle. This unique valve construction also provides improved frothing performance. Its actuator 34 and its location at the bottom of the milk receptacle 16 provide an effective vapor seal as the milk is withdrawn. No additional air is introduced into the frothing valve beyond the proper amount set in the air intake tube, as discussed below. The addition of more air may compromise the milk frothing process.

In normal operation, milk is drawn through valve 32, valve actuator 34, and milk uptake tube 38 into frothing valve 40. Frothing valve 40 is a venturi-type valve. Aperture 42 connects the milk uptake tube 38 to cavity 44 in the frothing valve. Aperture 46 connects steam intake tube 48, which brings steam from heater 49, to the cavity 44. As can best be seen with reference to FIG. 3, steam intake tube 48 is connected by a threaded end to a mated surface of aperture 46. Immediately downstream from aperture 46 is a plastic hollow nozzle 50. Nozzle 50 has a bullet shape and has a trailing lip 52 which matches and is engaged by the contours of cavity 44. Thus, nozzle 50 is mobilized in the forward direction by its trailing lip 52, and in a reverse direction by the end of steam intake tube 48.

Nozzle 50 has a forward tip 54 having a small central aperture 56. This aperture 56, in combination with the stepped-in internal contour of nozzle 50, is designed to concentrate and accelerate the inflow of steam, to improve froth production. Tip 54 is situated immediately adjacent to aperture 42 for receiving milk and air. Thus, as milk and air enter cavity 44 via aperture 42, they are immediately contacted by a rapid stream of steam emitting from aperture 56. This directs the milk, air, and steam through narrowed throat 58, which creates a venturi effect, further accelerating the mixture. The rapid acceleration of steam, air and milk also creates a partial vacuum in cavity 44. This vacuum can be used to draw milk, air and steam into cavity 44 from the upstream direction.

Figure 4:
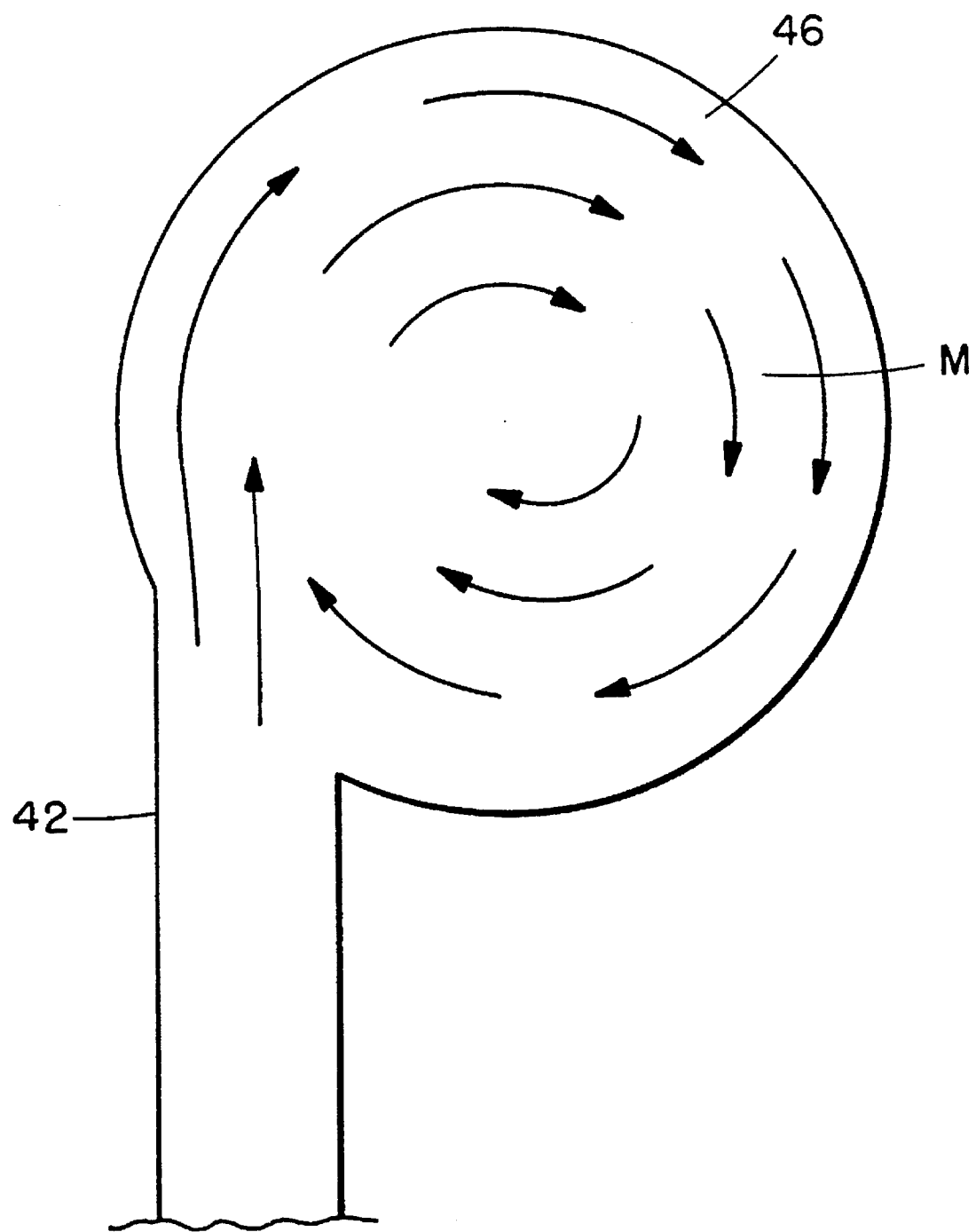
FIG. 4 is a diagram of a cross-section of the valve of FIG. 3 along line A–A' in the direction indicated.

As can be seen with reference to FIG. 4, cavity 44 has a substantially circular cross-section. Aperture 42 for receiving milk and air is tangentially offset from the circular cross-section. This construction permits improved frothing by sending the milk M and air, as well as the steam which hits them, into a swirling vortex about the walls of cavity 44.

As the milk, air and steam combination flows through throat 58, it enters frothing section 60. Frothing section 60 has two features designed to maximize froth: flared inner walls and a conical spring 62. The conical shape of conical spring 62 approximates the flare of the inner walls. As the milk/air/steam mixture contacts the flared walls and conical spring 62, it is further agitated and frothed. The frothed milk is emitted from aperture 64 into milk dispenser 66, which is attached to aperture 64 via mated threaded ends.

Frothing valve 40 is located within housing 12 and is permanently connected in the factory to steam intake tube 48 and the milk dispenser 66. This construction eliminates the quick disconnect feature present in the prior art (see, e.g., U.S. Pat. No. 5,473,972, discussed above) which allowed the frothing valve to be quickly disconnected from the main housing for cleaning. Cleaning is considerably more laborious under that method than the method disclosed by the present invention, and quick disconnects require expensive fittings and frequent maintenance. Thus, the construction of the present invention provides enhanced ease of cleaning, economies of production, and enhanced product reliability.

Figure 3:
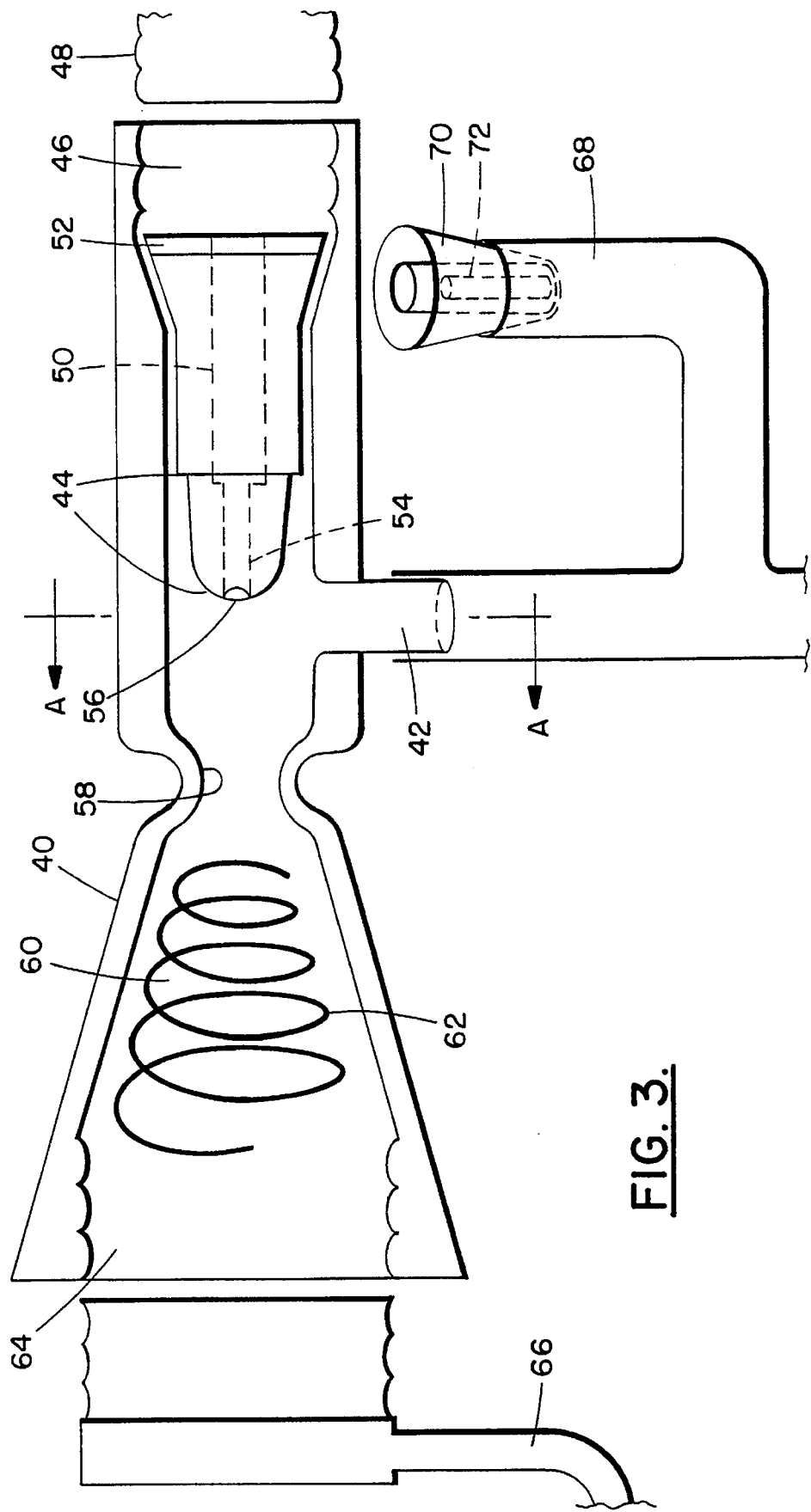
FIG. 3 is a side cross-sectional view of a preferred frothing valve of the present invention.

As can also be seen in FIG. 3, this preferred embodiment of the present invention incorporates a unique air intake valve. Air intake tube 68 joins milk uptake tube 38 upstream of aperture 42. This serves to properly mix air and milk before they are introduced into frothing valve 40, which in turn maximizes froth production. Furthermore, air intake tube 68 has a unique air control plug 70 inserted in its air intake end. Plug 70 has a slot 72 along an exterior surface for at least part of its length. When the plug is inserted into air intake tube 68, the volume of air taken in is controlled by the surface area and depth of the slot exposed. Thus, when the plug is installed, it can be set to allow a proper rate of air intake. This construction provides a range of adjustment which permits proper airflow. This allows reasonable manufacturing tolerances without compromising the performance of the air intake valve.

Another preferred plug 70 has a slot 72 whose dimensions vary along the length of plug 70, e.g., the slot 72 is deep at a first end and progressively becomes shallower and eventually merges with the surface of plug 70. This allows even greater fine-tuning of air intake by factory installers. This setup is an accurate and inexpensive alternative to the user-operated air flow controls used in the prior art, which controls also require frequent maintenance, and, if set improperly, can cause unsatisfactory froth production. Apart from the slot 72, plug 70 can be solid or can have a central aperture through its length to allow increased airflow therethrough or to accept a rod therethrough for strength or ease of manipulation. Plug 70 may be tapered or untapered.

Referring back to FIG. 2, the cappuccino maker also comprises a water receptacle 14 having a lip 36 about its lower surface, and a valve 32 extending from its lower surface. The lip about the valve creates a concave region which engages base 18 and valve actuator 34 to provide proper alignment and secure seating for water receptacle 14. Valve actuator 34 engages and opens valve 32 to permit water to flow via water uptake 74 into heater 49 in housing 12. Water uptake 74 may include a pump 76.

Water heated in heater 49 may be sent as steam to frothing valve 40, as discussed above, or as hot water or steam into coffee filter 78. Switch 24 controls the selection of steam and hot water. Switch 24 also allows the cappuccino maker to be used to produce espresso or coffee alone, without addition of frothed milk. Hot water or steam is sent from heater 49 into stainless steel coffee filter 78 where it contacts coffee or espresso grounds E. Coffee or espresso is produced, which in turn drips into filter holder 26 and through coffee dispenser 80. Coffee dispenser 80 has a dispensing end over the container receiving location and in proximity to the dispensing end of frothed milk dispenser 66 so that cup C can receive coffee and frothed milk, sequentially or simultaneously, without being moved. This arrangement is much more convenient for the user. Many prior art machines require the user to move the cup from a first coffee dispensing location to a second frothed milk dispensing location.

What is claimed is:

1. In a cappuccino maker comprising a housing, a steam source, means for making coffee using water from said steam source, a coffee dispensing spout for dispensing said coffee, a means for making frothed milk and a milk dispensing spout for dispensing said frothed milk, said milk dispensing spout and said coffee dispensing spout capable of dispensing milk and coffee over a container-receiving location, thus permitting milk and coffee to be dispensed into a container without having to move the container, an improvement comprising:

a milk receptacle having a valve means; and a first base for the milk receptacle having means for engaging the valve means and a raised lip for receiving the milk receptacle or, in an absence of said receptacle, a cleaning fluid, said lip forming a reservoir on said first base.

2. The cappuccino maker of claim 1, wherein said milk receptacle has a bottom surface and said valve means is located on said bottom surface.

3. The cappuccino maker of claim 1, further comprising a second base and a water receptacle comprising a bottom surface and a lip protruding from said bottom surface to form a concave surface that accepts the second base to provide a physical coupling therebetween.

4. The cappuccino maker of claim 1, wherein the milk receptacle further comprises a lid and a flat bottom surface, thereby making said receptacle suitable for storage in a refrigerator when not in use in said cappuccino maker.

5. The cappuccino maker of claim 1, wherein the raised lip for receiving the milk receptacle is of sufficiently greater height than the means for engaging the valve means to allow liquid to flow by gravity into the means for engaging the valve means when said reservoir is filled with said cleaning fluid.

6. The cappuccino maker of claim 1, wherein the means for making frothed milk comprises a frothing valve, the frothing valve comprising:

a tubular body having an internal cavity, a first end and a second end;

at least one aperture leading to the cavity for receiving milk and air;

an aperture leading to the cavity at the first end of the tubular body for receiving steam;

a narrowed throat section, to produce a venturi effect, intermediate the first and second ends;

a frothing section between the narrowed throat section and the second end having a flared inner surface; and an aperture in communication with said flared inner surface for release of frothed milk at the second end.

7. The cappuccino maker of claim 6, further comprising an air intake valve, the air intake valve comprising:

an air intake tube;

a plug positioned at an air intake extremity of said tube and having an exterior slot along at least a portion of its length that, when said plug is fitted into the air intake tube, enables an air intake via said slot into said air intake tube, the dimensions of said slot acting to control an amount of said air intake.

8. The cappuccino maker of claim 7, wherein said slot has a varying dimension along said plug so that said amount of said air intake is controlled by the length of said plug extending from said air intake extremity.

9. The cappuccino maker of claim 7 wherein said plug has a central aperture.

10. The cappuccino maker of claim 7, wherein the means for making frothed milk further comprises a milk uptake tube joining the means for engaging and the frothing valve, and wherein the air intake tube is joined to the milk uptake tube upstream from the frothing valve.

11. The cappuccino maker of claim 6, wherein the cavity has a substantially circular cross-section, and the aperture for receiving milk and air is substantially tangentially offset from the circular cross-section of the cavity.

12. The cappuccino maker of claim 6, wherein the frothing valve further comprises a hollow nozzle inserted into the aperture for receiving steam, said nozzle comprising a trailing lip, and a forward tip having a central aperture, and wherein said cavity has a shape to accept said trailing lip so that said forward tip is situated in proximity to the aperture for receiving milk and air.

13. The cappuccino maker of claim 6, wherein the frothing valve further comprises a conical spring situated in the frothing section.

14. The cappuccino maker of claim 6, wherein the frothing valve is made of plastic.

15. The cappuccino maker of claim 6, wherein the frothing valve is located within the housing and is fixedly connected to the steam source and the milk dispensing spout.

* * * * *